PHOTOELECTRIC TRANSDUCER HEAD

Filed Nov. 12, 1965

INVENTOR:
David Paul Gregg

By Keith D. Beecher
Attorney

United States Patent Office 3,349,273

Patented Oct. 24, 1967

3,349,273
PHOTOELECTRIC TRANSDUCER HEAD

David Paul Gregg, Los Angeles, Calif., assignor to Gaus Electrophysics, Los Angeles, Calif., a partnership Filed Nov. 12, 1965, Ser. No. 507,291
8 Claims. (Cl. 313—95)

ABSTRACT OF THE DISCLOSURE

A photoelectric transducer unit is described herein of the photomultiplier type. The particular unit is suitable for simultaneously responding to a plurality of light signals and of providing corresponding separate electrical signals at its output.

The present invention relates to photo-electric transducers; and it relates more particularly to an improved video pick-up unit of the photomultiplier type, which has a capacity for independently responding to two or more distinct light signals and of converting the light signals into respective independent electrical signals.

As is well known, photomultipliers make use of the phenomenon of photo-emission and secondary electron emission so as to be capable of detecting low amplitude light signals. Photo-multiplier units usually comprise a photo-cathode, and a series of secondary emission electrodes, or dynodes. In such a unit, the incident light signal is directed to the photo-cathode, which is composed, for example, of a cesium (Cs) compound, or other material capable of photo-electric emission.

The electrons released from the photo-cathode due to the incident light signals are accelerated and directed to one of the secondary emission electrodes, or dynodes. Each primary electron which impinges on the first dynode releases several secondary electrons. The multiplying process is then repeated from one dynode to the next throughout the series of dynodes, so that an amplification of the initial photo-current produced at the photo-cathode is possible.

Copending application Ser. No. 507,474, filed Nov. 12, 1965, in the name of Keith O. Johnson, and assigned to the present assignee, discloses a video signal reproducing system in which two distinct electrical signals are produced in response to the sensing of optical recordings in one, or more, tracks of an optical recording medium. As fully described in the copending application, the two electrical signals produced by the reproducing system are used in a servo control system. The control system responds to the signals to maintain the sensor of the reproducing system in proper registry with the track of the optical recording medium.

The photo-electric transducer head of the present invention is particularly suited for use in video signal reproducing systems such as described in the aforesaid copending application. However, it will become evident as the description proceeds that the improved photo-electric transducer of the present invention has general utility wherever two or more distinct electrical signals are to be produced by a simple and compact unit in response to a corresponding plurality of incident light signals.

It is, accordingly, an object of the present invention to provide an improved, compact and inexpensive photo-electric transducer head.

A more specific object of the invention is to provide such an improved photo-electric transducer head of the photo-multiplier type, and one which is capable of producing independent electrical output signals in response to the application thereto of two or more incident light signals, and of achieving this result inexpensively, with a minimum of components, and in a compact unit.

The feature of the invention which are believed to be new are set forth in the claims. The invention itself, however, together with further objects and advantages thereof, may best be understood by reference to the following description, when the description is taken in conjunction with the accompanying drawings, in which:

Figure 1:
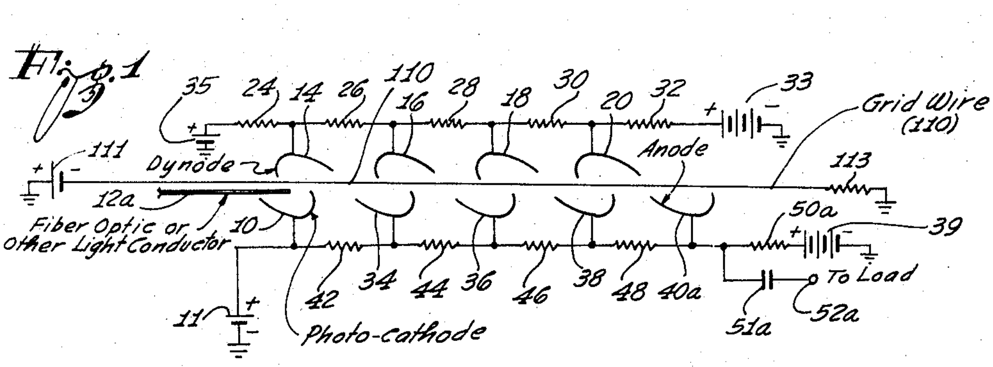
FIGURE 1 is an electrical circuit diagram schematically showing the electrical connections of a typical photo-multiplier photo-electric transducer.

The photo-muliplier device shown in schematic and electrical circuit diagram in FIGURE 1 includes, for example, a photo-cathode 10 which, as shown, is connected to a relatively low positive potential source 11. The photo-cathode 10 may be composed of any appropriate material, or group of materials, which are capable of photo-emission. For example, the following materials are appropriate: Cs—O—Ag; Cs—Sb(O); Cs—Ag—Bi; Na—K—Sb; Na—K—Cs—Sb.

The photo-cathode 10 receives a light signal from, for example, a pair of fiber optics 12*a*, 12*b*, or other light conductors, which conducts the signal from a source, and introduces it to the surface of the photo-cathode. The introduction of the light signal to the photo-cathode surface causes it to emit electrons. These electrons are directed to a first dynode 14.

The first dynode 14, together with a plurality of additional dynodes 16, 18 and 20, for example, are connected to the junction points of a chain of resistance elements 24, 26, 28, 30 and 32. These resistance elements are connected between the positive terminal of a relatively high direct current voltage source 33 and the positive terminal of a relatively low direct current voltage source 35, so that each junction point is progressively at a more positive voltage with respect to ground than the preceding point. Likewise, the assembly includes a second series of dynodes 34, 36 and 38, and a pair of anode sections 40*a* and 40*b*. This second series is connected, for example, to the common junctions of a second series of resistance elements 42, 44, 46, 48 and 50*a*, 50*b*. The second series of resistance elements is likewise connected between the positive terminal of a relatively high direct voltage source 39 and the relatively low direct voltage source 11.

The electrical connections are such that each progressive dynode is at a higher positive potential with respect to ground than the preceding dynode. For example, the dynode 14 is at a higher positive potential than the photo-cathode 10, the dynode 34 is at a higher positive potential than the dynode 14; the dynode 16 is at a higher positive potential than the dynode 34; the dynode 36 is at a higher positive potential than the dynode 16; and so on.

The dynodes are composed of appropriate secondary emission material, and each of these electrodes emits several secondary electrons for each primary electron incident thereon. The dynodes may be formed, for example, of any of the following materials: Cs—Sb; Cs—Ag—O.

It will be appreciated, therefore, that the primary electrons from the photo-cathode 10 causes the dynode 14 to emit an increased number of secondary electrons which are directed to the dynode 34 so that the multiplying process continues. Finally, an amplified photo-current is caused to flow through the resistors 50*a* and 50*b* by the anode sections 40*a*, 40*b*, and an output electrical signal appears at the output terminals 52*a* and 52*b* which are coupled through capacitors 51*a*, 51*b* to the junctions of the respective resistors 50*a* and 50*b* and the respective anode sections 40*a* and 40*b*. The anode sections 40*a* and 40*b* are physically separated and insulated from one another; and the resistors 50*a* and 50*b* have sufficiently large values to function as electrical isolating resistors.

Figure 3:
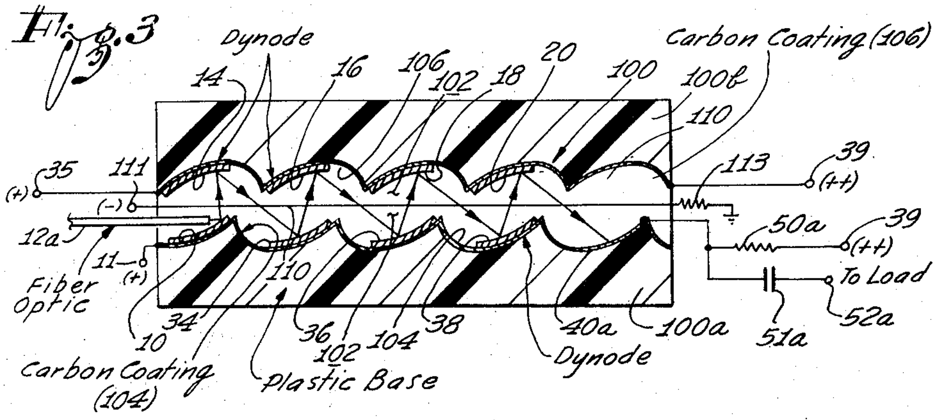
FIGURE 3 is a sectional view of the transducer unit of FIGURE 2, taken substantially on the line 3—3 of FIGURE 2.

The photo-electric transducer unit of the present invention may be constructed, for example, from a block of extruded ceramic 100. As shown in the sectional view of FIGURE 3, the block is formed of an upper and lower piece, each respectively defining an upper internal wall and a lower internal wall for a chamber 102 within the housing formed by the ceramic block 100.

Each of the aforesaid walls is formed into a series of distinct concave surfaces each of which extends across the unit from one side to the other. Each of the walls is coated with a resistance material, such as carbon, so as to provide coatings 104 and 106. These carbon coatings provide the resistance chains equivalent to those formed by the resistance elements in FIGURE 1.

Figure 2:
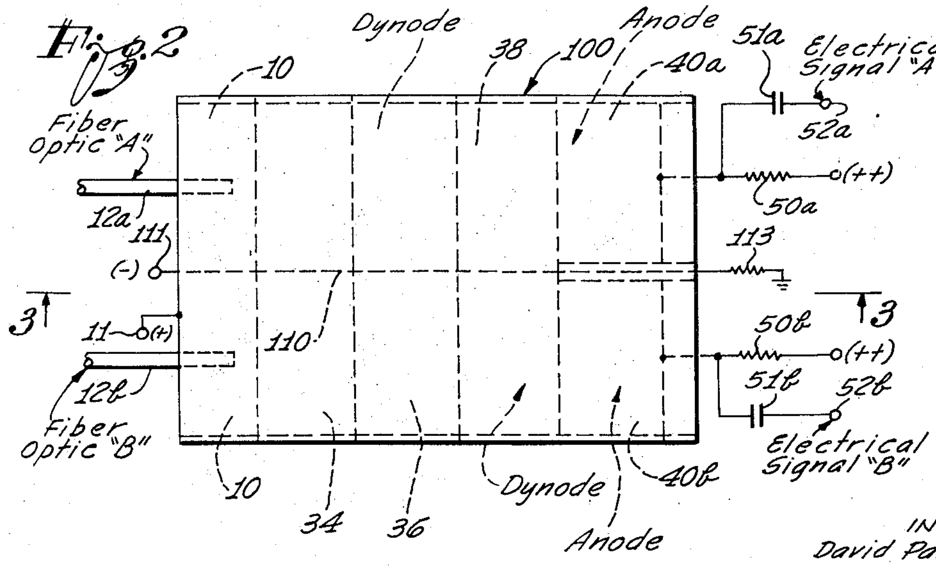
FIGURE 2 is a plan view of a photo-multiplier photo-electric transducer unit constructed in accordance with the concepts of the present invention.

For example, the carbon coating 104 on the lower piece 100*a* of the block 100 is connected to the source 11 at one end, and through the aforesaid resistors 50*a* and 50*b* to the positive terminal of the direct current voltage source 39 at the other end. As will be described, the particular unit of the present invention has a dual capacity, so that, as best shown in FIGURE 2, the pair of isolating resistors 50*a* and 50*b* is provided, and the corresponding pair of output terminals 52*a* and 52*b* is coupled to the respective load resistors through the respective coupling capacitors 51*a*, 51*b*.

The photo-cathode 10 is deposited on the carbon coating on the left hand concave surface in the lower piece 100*a*. The photo-cathode extends transversely across the carbon coating 104 in the corresponding concave surface, as shown.

The fiber optics 12*a* and 12*b* are mounted so that they extend into the end of the housing formed by the block 100. The fiber optics 12*a* and 12*b* extend into the housing, as shown in FIGURE 2, so as to terminate adjacent opposite ends of the transverse photo-cathode 10.

The dynodes 14, 16, 18, 20, 34, 36, 38 are formed of appropriate material over the carbon deposits 104, 106 on the remaining concave surfaces of both pieces 100*a* and 100*b*. It will be appreciated that both the photo-cathode 10 and the dynodes can be formed by vacuum sputtering, or any other appropriate depositing process. The dynodes are positioned so as to receive electrons from the photo-cathode 10, and from one another, in the manner described in conjunction with FIGURE 1.

A grid wire 110 extends through the housing 100 from one end to the other. The grid wire extends transversely of the aforesaid dynodes and the photo-cathode. This grid wire is connected between the negative terminal of an appropriate direct current voltage source 111 and a grounded resistor 113, so that it exhibits a negative potential with respect to ground. Therefore, the electrons produced by the photo-cathode 10 in response to the light signals introduced to the photo-cathode by the fiber optics 12*a* and 12*b* are maintained separate; as are all the secondary electrons produced by the dynodes as a result of the primary electrons. The anode sections 40*a* and 40*b* are physically separated, these sections being respectively connected to the resistors 50*a* and 50*b*. In this manner, distinct electrical signals may be derived at the output terminals 52*a* and 52*b*.

The construction described above provides a simple and compact photo-electric transducer head. The head is particularly advantageous in the conversion of separate and distinct light signals into corresponding independent electrical signals, and of achieving this conversion simply and in a minimum of space.

While a particular embodiment of the invention has been described, modifications may be made. It is intended in the following claims to cover all modifications which come within the scope of the invention.

What is claimed is:

1. A photo-electric transducer including: photo-cathode means; at least two light-signal conducting means mounted adjacent said photo-cathode means for simultaneously introducing a corresponding number of light signals to different parts of said photo-cathode means; at least one dynode means positioned to receive electrons from said photo-cathode means resulting from the introduction of said light signals to said photo-cathode means; and an electrode traversing said dynode means and adapted to be established at a negative potential with respect to the potential of said dynode means so as to provide a barrier for the electrons and maintain the electrons from said different parts of said photo-cathode means in response to respective ones of said light signals in a separated condition.

2. A photo-electric transducer including: photo-cathode means; at least two light signal conducting means mounted adjacent said photo-cathode means for simultaneously introducing a corresponding number of light signals to different parts of said photo-cathode means; a plurality of secondary-emission dynode means positioned to receive electrons from said photo-cathode means and from one another and to produce additional electrons in response thereto; and an electrode traversing each of said dynode means and said photo-cathode means and adapted to be established at a negative potential with respect to the potential of said photo-cathode and of said dynode means and provide a barrier for electrons and maintain the electrons resulting from one part of said photo-cathode means in response to one of said light signals separate from the electrons resulting from another part of said photo-cathode means in response to the other of said light signals.

3. A photo-electric transducer including: a housing having a pair of opposing internal walls shaped to define respectively a first series of distinct surfaces and a second series of distinct surfaces, the surfaces of said first series respectively opposing the surfaces of said second series; photo-cathode means disposed on one of said surfaces; at least two light-signal conducting means extending into said housing and terminating adjacent said photo-cathode means for simultaneously introducing a corresponding number of light signals to different parts of said photo-cathode means; a plurality of secondary emission dynode means disposed on the others of said surfaces of said first and second series in an electron-multiplying relationship with one another and with said photo-cathode means; first resistance means interconnecting said photo-cathode means and said dynode means on said surfaces of said first series and a second resistance means interconnecting said dynode means on said surfaces of said second series; and an electrode extending through said housing and traversing said photo-cathode means and said dynode means to provide a barrier for electrons and maintain the electrons resulting from one part of said photo-cathode means in response to one of said light signals separate from the electrons resulting from another part of said photo-cathode means in response to the other of said-light signals.

4. The photo-electric transducer defined in claim 3 in which said first and second resistance means are each formed of a coating of electrical resistance material on each of said opposing internal walls and extending under said dynode means and under said photo-cathode means.

5. The photo-electric transducer defined in claim 3 in which said housing is formed of a plastic material.

6. The photo-electric transducer defined in claim 3 in which said electrode is in the form of a grid wire adapted to be established at a negative potential with respect to the potential of said photo-cathode and of said dynode means.

7. The photoelectric transducer defined in claim 3 in which said light-signal conducting means are in the form of first and second fiber optics.

8. The photoelectric transducer defined in claim 3 and which includes first and second mutually insulated anode sections disposed to receive respectively the electrons resulting from said one part of said photo-cathode, as multipled by said dynode means and said electrons resulting from said other part of said photo-cathode as multiplied by said dynode means.

References Cited

UNITED STATES PATENTS

| | | | |
|---|---|---|---|
| 2,232,900 | 2/1941 | Brewer | 313—105 |
| 2,304,755 | 12/1942 | Zworykin | 250—207 |
| 2,755,390 | 7/1956 | Teichmann | 250—227 |
| 3,112,360 | 11/1963 | Gregg | 250—227 X |
| 3,244,922 | 4/1966 | Wolfgang | 313—95 |

FOREIGN PATENTS

| | | |
|---|---|---|
| 873,161 | 9/1957 | Great Britain. |

JAMES W. LAWRENCE, *Primary Examiner.*

R. JUDD, *Assistant Examiner.*